US006206069B1

(12) United States Patent
Saukkonen

(10) Patent No.: US 6,206,069 B1
(45) Date of Patent: Mar. 27, 2001

(54) METHOD AND APPARATUS FOR SURFACING A BOARD-LIKE OBJECT

(75) Inventor: Seppo Saukkonen, Porvoo (FI)

(73) Assignee: Sunds Defibrator Loviisa Oy, Valko (FI)

(*) Notice: Subject to any disclaimer, the term of this patent is extended or adjusted under 35 U.S.C. 154(b) by 0 days.

(21) Appl. No.: 09/060,880

(22) Filed: Apr. 16, 1998

(30) Foreign Application Priority Data

Apr. 16, 1997 (FI) ..................................................... 971603

(51) Int. Cl.$^7$ ..................................................... B32B 31/00

(52) U.S. Cl. ............................ 156/443; 156/382; 29/464; 29/281.1; 269/21

(58) Field of Search .................................... 156/443, 382, 156/538, 556, 559; 29/464, 468, 281.1; 269/21

(56) References Cited

U.S. PATENT DOCUMENTS

| | | | | |
|---|---|---|---|---|
| 4,173,275 | | 11/1979 | Pfeiffer et al. | 198/418.3 |
| 4,336,094 | * | 6/1982 | Mills | 156/299 |
| 4,367,107 | * | 1/1983 | Valimont et al. | 156/102 |
| 4,861,406 | | 8/1989 | Baker et al. | 156/230 |
| 5,473,406 | * | 12/1995 | Hassall et al. | 355/22 |
| 5,718,791 | * | 2/1998 | Spengler | 156/212 |

FOREIGN PATENT DOCUMENTS

| | | |
|---|---|---|
| 770444 | 10/1977 | (FI) . |
| C54873 | 10/1979 | (FI) . |

* cited by examiner

*Primary Examiner*—Francis J. Lorin
(74) *Attorney, Agent, or Firm*—Birch, Stewart, Kolasch & Birch, LLP

(57) ABSTRACT

The present invention is related to a method of surfacing at least one wide side of a board-like substrate, in which method at least one wide side of the substrate board and at least one sheet or web of the surfacing material are placed opposing each other. In the method, the surfacing material (1) and the board-like object (2) of the substrate material are transferred into a positioning station so that the at least one aligned edge of the surfacing material (1) and the board-like substrate (2), respectively, are made to desiredly overlap or underlap the respective edge of the opposed element surface, or alternatively, that at least one of said edges is placed essentially aligned with other respective edge of the opposed element surface, irrespective of the initial position or alignment of the surfacing material (1) and/or the board-like substrate (2) to be transferred into the positioning station.

20 Claims, 2 Drawing Sheets

METHOD AND APPARATUS FOR SURFACING A BOARD-LIKE OBJECT

BACKGROUND OF THE INVENTION

1. Field of the Invention

The present invention relates to a method of surfacing at least one wide side of a substrate.

2. Background Art

In the art of manufacturing surfaced boards, such as particle boards laminated with a variety of different surfacing materials such as a decorative melamine layer, the sheet of surface lamination has usually been made larger than the board to be surfaced. The need for this practice has chiefly been caused by the inaccurate positioning systems used in lamination. Conventional laminating lines have not been able to align the core board and surface sheet stacks in constant positions in a repetitive manner. Consequently, the positioning of the surface sheets with respect to the boards has been hampered by alignment errors. Hence, complicated positioning systems have been employed to locate the surface sheet accurately with regard to the substrate board. Moreover, it has been necessary to trim away the excess surface sheet overlapping the edges of the substrate board. This requires an extra work step. The implementation of conventional lamination methods has therefore involved the use of complicated apparatuses. A further shortfall of the conventional art is the material loss due to the trimmed-off edges.

SUMMARY OF THE INVENTION

It is an object of the present invention to achieve a method of surfacing a board-like object by a surfacing material of sheet or web format in a manner capable of overcoming the drawbacks of prior-art methods.

The method according to the present invention offers a number of significant benefits. For instance, the method according to the invention makes it possible to locate the surfacing material and the substrate board accurately into desired positions irrespective of the initial position or alignment of the surfacing material and/or the board-like substrate. Therefore, the precise positioning of the surfacing material with respect to substrate such as a board avoids trimming waste of the surfacing material. The surfacing process thus becomes simpler and faster. Also the apparatus required to implement the method is less complicated. According to an embodiment of the invention, complicated control systems are not required. By virtue of using an elastic gripper means, the surfacing material and the substrate board can be located accurately against a backgage without any risk of damage to the surfacing material or the substrate board.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
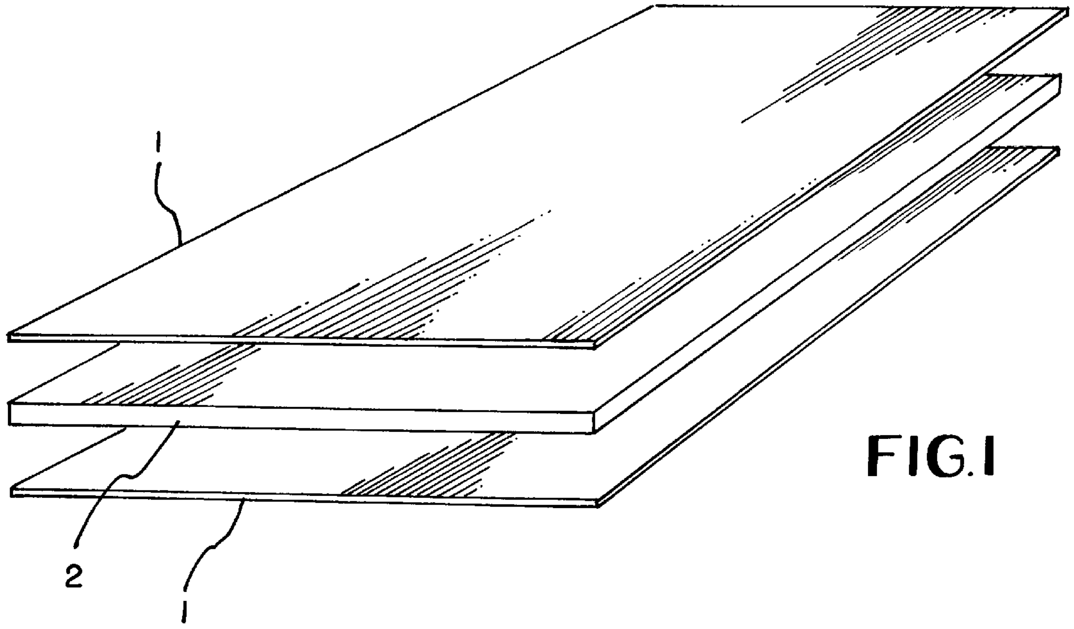
FIG. 1 is a perspective view of a board to be surfaced and the surfacing material sheets to be bonded thereto.
Figure 2:
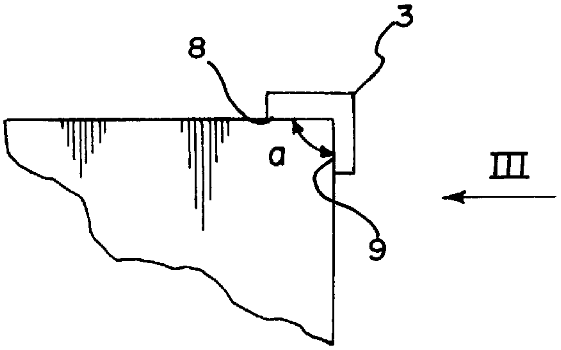
FIG. 2 is a detail view of a backgage assembly.
Figure 3:
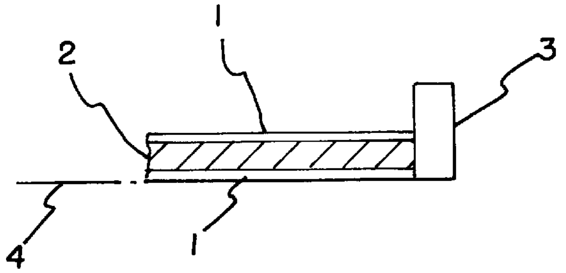
FIG. 3 is a view of the backgage assembly as seen from the direction of arrow III in FIG. 2.
Figure 4:
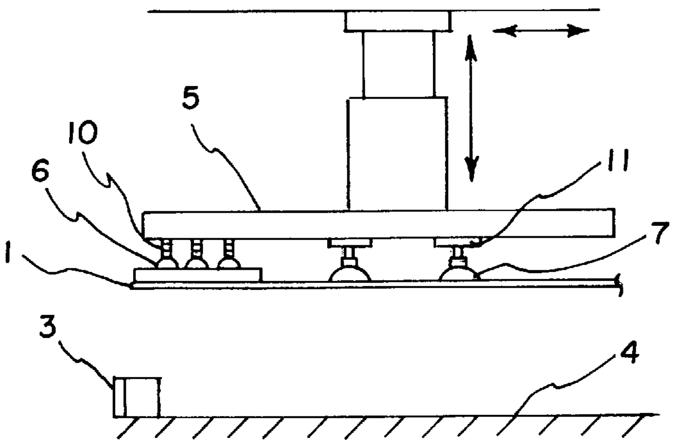
FIG. 4 is a side view of an apparatus according to the invention.

The method according to the invention for surfacing at least one wide side of a board-like object comprises positioning at least one wide side of the board with at least one sheet or web of the surfacing material opposing each other. According to the method, the surfacing material 1 and the board-like object 2 of the substrate material are transferred into a positioning station so that the at least one aligned edge of the surfacing material 1 and the board-like substrate 2, respectively, are made to overlap or underlap the respective edge of the opposed element surface, or alternatively, that at least one of said edges is placed essentially aligned with other respective edge of the opposed element surface, irrespective of the initial position or alignment of the surfacing material 1 and/or the board-like substrate 2 to be transferred into the positioning station.

In an embodiment of the invention, at least two edges of the surfacing material 1 and the board-like substrate 2 are aligned to a desired overlap with the respective edge of the opposed element surface. Advantageously, said two edges are those meeting at a corner of the element. In another embodiment, at least two respective edges of the surfacing material 1 and the board-like substrate 2 are aligned with each other without an essential overlap or underlap of opposed element surfaces. Herein, the goal is to achieve an essential alignment of at least two respective edges of the opposed surfaces of the surfacing material 1 and the board-like substrate 2.

The positioning of the board-like substrate and the surfacing material sheet is performed most appropriately with the help of a backgage 3. The backgage may be made fixed, or alternatively, movable to a desired position, whereby accurate location of the surfacing material 1 and the board-like substrate 2 is possible during the mutual positioning of these elements.

In the method, the board-like substrate 2 and the surfacing material sheet or web 1 are positioned accurately above one another so that:

- either a substrate board 2 or a surfacing material sheet 1 is transferred into a position abutting a backgage 3, the substrate board 2 or respectively the surfacing material sheet 1 is lowered onto a platform 4 keeping it abutting the backgage 3,
- above the lowered element is brought a second element which may be respectively either a surfacing material sheet 1 or a substrate board 2, whereby it is positioned to abut the backgage 3, and
- the surfacing material sheet 1 or the substrate board 2, respectively, is lowered in abutting contact with the backgage 3 onto the sheet or board, respectively, resting on the platform 4.

As mentioned above, the backgage 3 can be driven into a desired location prior to the positioning of the surfacing material sheet and/or the board-like substrate element.

The surfacing material sheet or web 1 and/or the substrate board 2 are transferred onto the platform 4 by means of a positioning assembly 5 comprising at least one gripper means 6, 7, which is arranged to be elastic in at least one direction.

The surfacing material sheet 1 and/or the board 2 are grabbed by the gripper means 6, 7 principally by the top surface of the element. Advantageously, the gripper means 6, 7 comprise at least one suction cup or the like gripper device. Advantageously, a greater number of suction cups 6, 7 is provided.

Advantageously, the backgage 3 comprises two surfaces 8, 9 aligned orthogonally to each other.

The set of gripper means 6, 7 is arranged to be elastic in at least one sideways direction perpendicular to the surface of the backgage 8, 9.

According to the method, onto the platform is initially transferred a first surfacing material sheet 1, onto which is then transferred a board 2, whereafter a second surfacing material sheet 1 is lowered on top of board.

The apparatus for accurate superimposed positioning of the board-like object 2 and the surfacing material sheet 1 comprises a positioning assembly 5 for transferring the surfacing material sheet and/or the substrate board onto the platform 4. The positioning assembly includes at least one gripper means 6, 7 incorporating at least one elastic member 10, 11. The surfacing material sheet 1 and/or the substrate board 2 are moved by means of the positioning assembly 5 to abut at least one surface 8, 9 of the backgage.

The elastic member 10 of the surface material gripper means 6 can be a spring or similar element. The elastic members 11 adapted to the gripper means 7 of the sheet 2 include telescoping slide members.

The gripper means includes at least one suction cup or the like gripper device. The gripper means 6, 7 are advantageously connected via the elastic members 10, 11 to the positioning assembly 5. The positioning assembly 5 comprises the gripper means 6, 7 suitable for grabbing both the surfacing material sheet and the substrate board.

Figure 5:
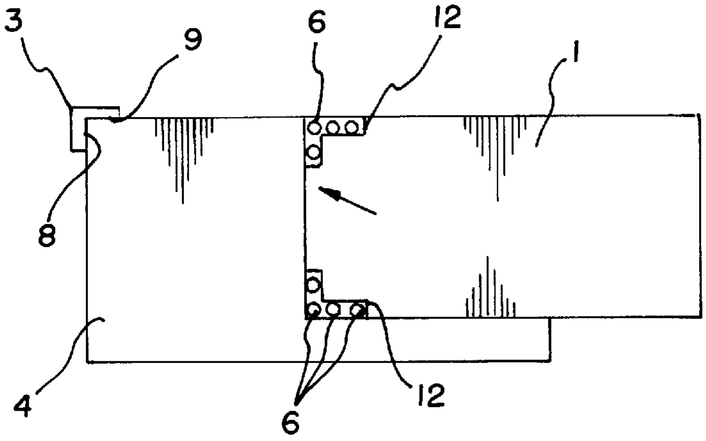
FIG. 5 is a plan view of the transfer of the surfacing material onto the substrate board.
Figure 6:
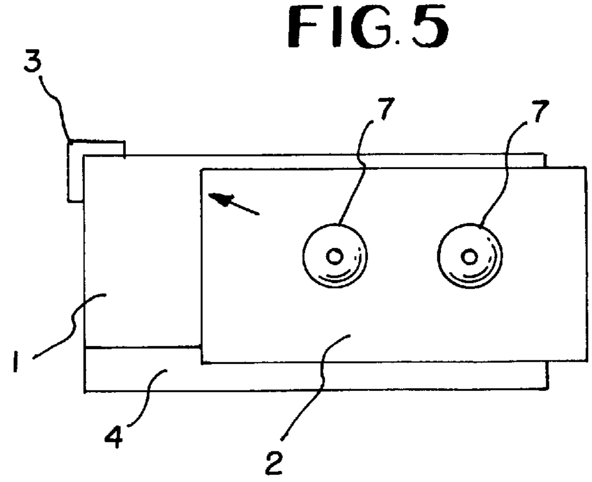
FIG. 6 is a plan view of the transfer of the substrate board onto the positioning platform.

Typically, the sheet gripper members comprise small-diameter suction cups 6 mounted on a support structure 12 such as a planar strip. In the context of the present invention, the term suction cup refers to a member having an essentially self-sealing rim so that a vacuum can be applied on the area enclosed by the rim. The strip 12 has advantageously an L-shaped form in a top view (refer to FIG. 5). With the help of the gripper means 6, the surfacing material sheet can be grabbed by its top surface, at least essentially close to the sheet corner to be abutting the inside corner of the backgage so that the edges of the sheet will be securely brought into contact with the backgage 3 when the sheet is being lowered by means of the gripper means.

Typically, the gripper means 7 for grabbing the substrate board 2 comprise suction cups of larger diameter than the suction cups grabbing the surfacing material sheet.

The backgage of the apparatus has two backing surfaces 8, 9 meeting at an angle $\alpha$ which advantageously is essentially equal to 90°. The same backing surface(s) is/are used in the positioning of both the sheet 1 and the board 2. According to a preferred embodiment of the invention, the backgage is made essentially stationary. According to another embodiment, the backgage is made movable.

The invention is suitable for use on the production lines of, e.g., laminated board products in which the surfacing material is in the form of a sheet or a web. After the accurate positioning operation, the sheet-board combination can be transferred from the platform to, e.g., a laminating press or similar post-processing apparatus.

To those versed in the art it is obvious that the invention is not limited by the exemplifying embodiments described above, but rather, can be varied within the scope and spirit of the appended claims.

What is claimed is:

1. A method for surfacing a substrate comprising:

providing a positioning assembly;

providing a platform having a substantially flat upper surface, the platform including a positioning member on the substantially flat upper surface of the platform;

providing a first substantially flat sheet of material;

positioning the first substantially flat sheet of material using the positioning assembly, so that the first substantially flat sheet of material abuts the positioning member;

lowering the first substantially flat sheet of material onto the substantially flat upper surface of the platform;

providing a second substantially flat sheet of material;

positioning the second substantially flat sheet of material using the positioning assembly, such that the second substantially flat sheet of material abuts the positioning member, and such that at least one edge of the first substantially flat sheet of material is substantially aligned with at least one edge of the second substantially flat sheet of material; and lowering the second substantially flat sheet of material onto the first substantially flat sheet of material, wherein the positioning member has an interior corner, the interior corner of the positioning member receiving the sheets of material when the respective sheets are positioned to abut the positioning member.

2. The method of claim 1, wherein the step of providing the first substantially flat sheet of material includes providing a substrate sheet, and the step of providing the second substantially flat sheet of material includes providing a sheet of surfacing material.

3. The method of claim 1, wherein the interior corner of the positioning member is a 90-degree corner.

4. The method of claim 1, wherein the step of providing a positioning assembly includes:

providing a first set of gripper members; and providing a second set of gripper members, the two sets of gripper members being elastically supported on the positioning assembly.

5. The method of claim 4, wherein the step of providing a first set of gripper members includes providing a first plurality of suction cups, the first plurality of suction cups each having a first diameter and being supported by at least one elastic member.

6. The method of claim 4, wherein the step of positioning the first sheet of material includes the steps of:

engaging the first set of gripper members with the first sheet of material; and advancing the first sheet of material into said interior corner of the positioning member using primarily a gripping force between the first set of grippers and the first sheet of material, until the first sheet of material abuts the interior corner.

7. The method of claim 6, wherein the step of positioning the second sheet of material includes the steps of:

engaging the second set of gripper members with the second sheet of material; and advancing the second sheet of material into the interior corner until the second sheet of material abuts the interior corner.

8. The method of claim 1, wherein the step of lowering the second substantially flat sheet of material onto the first substantially flat sheet of material includes the step of lowering the second substantially flat sheet of material while the second sheet abuts the positioning member.

9. A method of surfacing a substrate comprising:

providing a positioning assembly having a first set of gripper members and a second set of gripper members, the two sets of gripper members being elastically supported on the positioning assembly;

providing a platform having a substantially flat upper surface, the platform including a positioning member on the substantially flat upper surface of the platform;

providing a first substantially flat sheet of material;

positioning the first substantially flat sheet of material using the positioning assembly, so that the first substantially flat sheet of material abuts the positioning member;

lowering the first substantially flat sheet of material onto the substantially flat upper surface of the platform;

providing a second substantially flat sheet of material;

positioning the second substantially flat sheet of material using the positioning assembly, such that the second substantially flat sheet of material abuts the positioning member, and such that at least one edge of the first substantially flat sheet of material is substantially aligned with at least one edge of the second substantially flat sheet of material; and lowering the second substantially flat sheet of material onto the first substantially flat sheet of material, wherein the first set of gripper members includes a first plurality of suction cups, the first plurality of suction cups each having a first diameter and being supported by at least one elastic member, and the second set of gripper members includes a second plurality of suction cups, the second plurality of suction cups each having a second diameter which is smaller than the diameter of each of the first plurality of suction cups, the cups in the second plurality of suction cups being supported by at least one elastic member.

10. The method of claim 9, wherein the suction cups in the first and second pluralities of suction cups have self-sealing rims.

11. The method of claim 9, wherein the second plurality of suction cups includes first and second subsets of suction cups, each of the subsets being arranged in an ell shape.

12. An apparatus for superimposed positioning of sheets of material, the apparatus comprising:

a platform having a substantially flat upper surface;

a positioning assembly disposed above the substantially flat upper surface of the platform, the positioning assembly being translatable towards and away from the substantially flat upper surface;

a positioning member located on the substantially flat upper surface of the platform, the positioning member having surfaces against which edges of stacked sheets of material are abuttable in order to position the sheets of material, the positioning member surfaces being approximately orthogonal to one another.

13. The apparatus of claim 12, wherein the surfaces of the positioning member form an interior corner.

14. The apparatus of claim 12, wherein the positioning assembly is translatable in a direction parallel to the substantially flat upper surface of the platform.

15. The apparatus of claim 12, wherein the positioning assembly includes at least one gripping member, the at least one gripping member being engageable with sheets of material in order to translate the sheets.

16. The apparatus of claim 15, wherein the at least one gripping member includes:

a first plurality of gripping members, the first plurality of gripping members being supported by at least one elastic member which is elastically deflectable in at least one direction parallel to the surface of the substantially flat upper surface of the platform; and a second plurality of gripping members, the second plurality of gripping members being supported by at least one elastic member.

17. The apparatus of claim 16, wherein the first plurality of gripping members includes a plurality of suction cups each having a first diameter, and the second plurality of gripping members includes a second plurality of suction cups each having a second diameter which is smaller than the diameter of each of the first plurality of suction cups.

18. The apparatus of claim 16, wherein the second plurality of suction cups includes two subsets of suction cups, the two subsets each being arranged in an ell shape.

19. The apparatus of claim 16, wherein the at least one elastic member supporting the second plurality of gripping members includes a spring.

20. The apparatus of claim 16, wherein the at least one elastic member supporting the first plurality of gripping members includes telescoping slide members.

* * * * *